United States Patent [19]
Scheetz et al.

[11] Patent Number: 4,505,753
[45] Date of Patent: Mar. 19, 1985

[54] CEMENTITIOUS COMPOSITE MATERIAL

[75] Inventors: Barry Scheetz, Lamont, Pa.; Janine M. Rizer, Waldorf, Md.; Michael Hahn, MPI-Eisenforschung, Fed. Rep. of Germany

[73] Assignee: Research One Limited Partnership, Towson, Md.

[21] Appl. No.: 509,685

[22] Filed: Jun. 30, 1983

[51] Int. Cl.³ ............................................. C04B 7/35
[52] U.S. Cl. ...................................... 106/90; 106/98
[58] Field of Search ................................ 106/90, 98

[56] References Cited

U.S. PATENT DOCUMENTS 4,118,242 10/1978 Kjohl et al. .......................... 106/98
4,310,486  1/1982 Cornwell et al. ..................... 106/98

Primary Examiner—James Poer
Attorney, Agent, or Firm—Lawrence I. Field

[57] ABSTRACT

A cementitious composite material exhibiting an exceptional combination of high tensile, flexural and compressive strengths as compared with generally accepted values for Class H cements is produced from a mixture having a low pH and containing a tobermorite-like gel.

8 Claims, 1 Drawing Figure

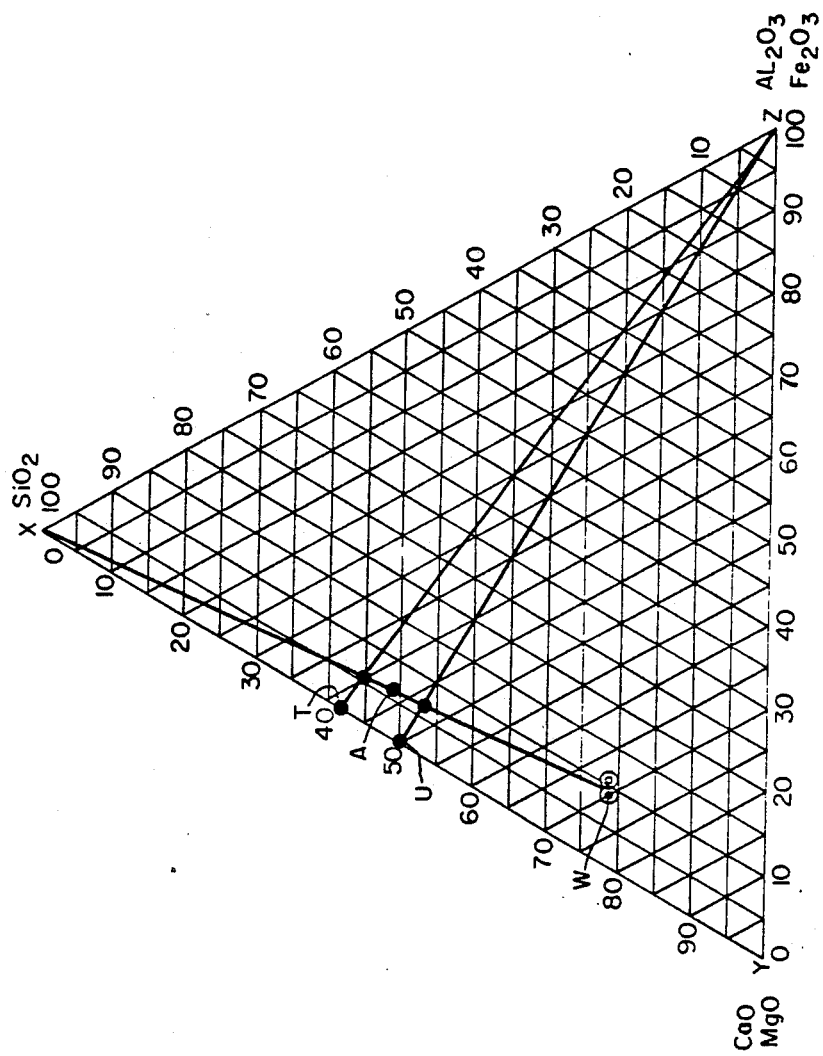

CEMENTITIOUS COMPOSITE MATERIAL

This invention is directed to a new cementitious composite material exhibiting a unique combination of properties. More particularly, it relates to a composite material with unusually high strength not found in any ordinary cementitious composite material previously known and which may be cast into objects in which such a combination of properties is desired.

It has been found that the desired combination of properties is obtained from cement mixtures containing a tobermorite-like gel.

The invention will be better understood from the description which follows, together with the drawings in which the single FIGURE is a ternary diagram on which compositions of interest are represented.

Typical properties of the cementitious composition of this invention are set forth in Table I where the properties are compared with generally accepted values for Class H cements.

TABLE I

| | Strength (Pounds/Inch$^2$) | |
|---|---|---|
| | Standard (28 Day) | This Invention (28 Day) |
| Splitting Tensile | 300 | 676 ± 85 |
| Flexural | 750 | 3,100 |
| Compressive | 4000 | 20,167 ± 2,248 |

In the description which follows, there is described a preferred embodiment of the invention as exemplified by a specific formulation of a material with the above combination of properties, but it is to be understood that the present description is presented by way of illustration and is not intended to be construed as limiting the invention in any way.

Briefly, the invention is a cementitious composite material formed from a mixture of the following:
(a) Portland Cement (Preferably API Class H)
(b) Chemically Active Silica (Preferably tiny spherical particles of amorphous silica known as condensed silica fume)
(c) A Type F Superplasticizer (Such as Sodium Salt of Formaldehyde Condensate of Naphthalene Beta Sulfonic Acid)
(d) Water
(e) An Antifoam Agent (Such as Tri-n-butyl phosphate)
(f) Fine Aggregate Each of the above will now be described in greater detail.

(a) The Portland Cement

While it appears that any of the various grades of Portland Cement which are commercially available are suitable for the production of the material of this invention, Type III Portland Cement is preferred and the Portland Cement known as API Class H is particularly preferred. Class H is the coarsest grind of Portland Cements. The Portland Cement component comprises between about 40 and 60% by weight of the mixture, about 52.1% being particularly preferred.

(b) The Chemically Active Silica

The chemically active silica in the mixture which produces the cementitious composite material of this invention is preferably an amorphous, non-crystalline, pozzolanic silicon dioxide and is most preferably condensed silica fume.

This condensed silica fume is produced as a by-product in the electric arc furnace production of silicon or silicon alloys such as ferrosilicon. The gases which are evolved during the manufacture of ferrosilicon from quartz, coke and iron ore when they are heated to up to about 2000° C. contain Si and SiO vapors which form SiO$_2$ when they react with air as they emerge from the furnace. These vapors condense in the above process, producing a commercially available product sold as condensed silica fume.

The very tiny spherical particles which result from condensation of the vapors are almost entirely amorphous silica with 20–25 m$^2$/g surface area. Typically, the particles analyze 85–92% SiO$_2$, up to 3% Fe$_2$O$_3$, 1–3% alkali metal oxides, 1–2% C, and the remainder being small amounts of alumina, lime and magnesia. A similar analysis is set forth in U.S. Pat. No. 4,321,243. The particles range in size from 0.01 to 0.3 micron with about 70% being smaller than 0.1 micron.

This constituent is believed to have pozzolanic properties in the present composition. Although in itself the chemically active condensed silica fume possesses little or no cementitious value, it will at ordinary temperatures and in the presence of moisture, chemically react with calcium present to form compounds possessing the desired improved cementitious properties. Two such possible reactions involving the finely divided silica fume leading to the production of tobermorite might be the following:

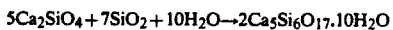

Furthermore, the use of chemically active silica fume in the mixture confers additional benefits. Because it is so finely divided, it helps to fill any interstital voids in the mixture. Because it is chemically active, it reacts with any Ca(OH)$_2$ present, or which forms during the hydrolysis of the calcium silicates in the Portland Cement, and therefore counteracts the known deleterious effects which are produced when free Ca(OH)$_2$ or free CaO are present in cements.

The amount of chemically active silica fume in the mixture should be between 5 and 25% by weight of the mixture and 7.1% is a preferred amount.

(c) Superplasticizer

To make the final mixture more fluid and to permit better wetting and mixing, a plasticizer is included in the composition, the preferred plasticizer being sold as Mighty 100 or Mighty 150 the active ingredient of which is the sodium salt of formaldehyde condensate of naphthalene beta-sulfonic acid. Mighty 100 is available as a powder and Mighty 150 is available as a liquid.

While it is not intended to be bound by any theoretical explanation, it is believed that the superplasticizer affects the zeta potential of the mixture and prevents flocculation. It also appears to increase the strength of the product by permitting the use of smaller amounts of water. Other known compounds may be used in place of Mighty 100 or Mighty 150 to disperse the silica fume in the mixture. Amounts between 1 and 3% by weight of the mixture have proven beneficial and a particularly preferred amount is about 1 or 1.1% by weight.

(d) Water

Water, preferably freshly distilled water, is the final required constituent for the mixture producing the high strength cementitious composite material of this invention. In order to obtain a product with the desired high strength, between 13 and 18% of water by weight of the mixture is added, about 14¼% being preferred.

(e) Antifoaming Agent (Optional)

While not necessary in all embodiments of this invention, in a particularly preferred embodiment an antifoaming agent is incorporated in the mixture yielding the cementitious composite material, Tri-n-butyl phosphate being the preferred additive the purpose of which is to reduce the amount and size of air pockets created or trapped in the final cementitious composite material which would decrease the strength of the material. The amount of antifoam agent in the mixture should be between 0 and ½% by weight and 0.05% by weight is a preferred amount.

(f) Fine Aggregate (Optional)

If desired, a fine aggregate may be included to the mixture. In a particularly preferred embodiment a crystalline form of silicon dioxide of a general size of finer than 5.0 microns is added. This seems to fill any interstitial voids between the cement grains and perhaps over a long period of time, slowly activates to an active silica capable of chemical reactions. Amounts between 0 and 40% by weight have been used with particularly good results being found at 25.5%.

TABLE II sets forth working and preferred proportions of the several ingredients, described above.

TABLE II

|  | % By Weight of Total Range | | Preferred |
|---|---|---|---|
| Portland Cement | 40 | To 60 | 52.1 |
| Active Silica Fume | 5 | To 25 | 7.1 |
| Superplasticizer | 1 | To 3 | 1.0 |
| Water | 13 | To 18 | 14.3 |
| Antifoam Agent | 0 | To 0.5 | 0.05 |
| Fine Aggregate | 0 | To 40 | 25.5 |

When prepared with the above identified proportions, the cements of this invention will have compositions falling within the triangle UTZ shown in the Ternary diagram of FIG. 1, particularly preferred compositions being those along that part of line XAW within triangle TUZ and particularly that at Point A.

PREPARATION OF THE MIX

The mix is prepared generally in accordance with ASTM Procedure C 305 for Mechanical Mixing of Hydraulic Cements (Part 5). In preparing the cement of the preferred proportions, first the mix water carrying the antifoam agent and the superplasticizer were poured into a mixing bowl equipped with a planetary action paddle mixer (Hobart mixer—ASTM Standard C 305-80), then the cement and the fine aggregate were dry blended by hand and the blend was then added to the bowl with mixing. Then the silica fume was added with mixing. After it has been mixed for the specified length of time, the mixture was placed into forms and permitted to set in the usual way. As an example of the preferred embodiment, a mixture was prepared as indicated above using the following in parts by weight:

| Portland Cement | 616 |
|---|---|
| Fine Aggregate (Minusil) | 300 |
| Superplasticizer | 12 |
| Tri-n-butyl Phosphate | 0.62 ml |
| Water | 169 |
| Active Silica Fume | 84 |

Test pieces were cast and permitted to set up in a moist box at room temperature for 24 hours after which the pieces were steam cured and then tests were run for tensile, flexural and compressive strengths. This mixture gave the following values (averaged).

|  | 3 Day | 28 Day |
|---|---|---|
| Tensile | 410 ± 54 | 675 ± 85 |
| Flexural | 1,498 ± 170 | 3,100 |
| Compressive | 9,250 ± 707 | 20,167 ± 2,248 |

To this mixture which produces the cementitious composite material of this invention other appropriate larger aggregates such as sand may be added. It is possible that such additions may be less attacked due to the lower pH created by the tobermorite as compared to the pH of standard cements and will be held more securely by the strengthened bonds and lighter aggregate filling. Up to about 5% by weight of sand may be added to the mixture.

Having now described the invention, it is not intended that it be limited except as may be required by the appended claims.

We claim:

1. A mixture for producing a cementitious composite material exhibiting a combination of high tensile, flexural and compressive strengths as compared with generally accepted values for Class H cements, in which said mixture comprises:
   a. between 40 and 60% by weight of Portland cement,
   b. between 5 and 20% by weight of pozzolanic amorphous silica known as condensed silica fume,
   c. between 1 and 3% by weight of a superplasticizer,
   d. between 13 and 18% by weight of water,
   e. up to 0.5% by weight of antifoam agent; and
   f. up to 40% by weight of "chemically inactive" particles of finely divided crystalline silica filler material.

2. The material of claim 1 in which the mixture also includes sand as an additive filler.

3. The material of claim 1 in which the mixture comprises in parts by weight:

| a. Portland cement | 52.1 |
|---|---|
| b. condensed silica fume | 7.1 |
| c. superplasticizer | 1.0 |
| d. water | 14.3 |
| e. antifoaming agent | .05 |
| f. fine aggregate | 25.4 |

4. The material in claim 3 in which the superplasticizer is the Sodium Salt of Formaldehyde Condensate of Naphthalene Beta Sulfonic Acid.

5. The material of claim 3 in which the antifoam agent is Tri-n-butyl phosphate.

6. The mixture of claim 1 in which the Portland Cement is Type III.

7. The mixture of claim 1 in which the superplasticizer is a Type F superplasticizer.

8. An article composed of the cementitious composite material produced from the mixture of claim 1.

* * * * *